United States Patent
Line et al.

(10) Patent No.: US 10,821,861 B2
(45) Date of Patent: Nov. 3, 2020

(54) ARTICULATING FLEXMAT SEAT SUSPENSION

(71) Applicant: Ford Global Technologies, LLC, Dearborn, MI (US)

(72) Inventors: Johnathan Andrew Line, Northville, MI (US); Robert Damerow, Garden City, MI (US); Carol Diane Casey, Dearborn, MI (US); Andrew Matusko, Dexter, MI (US); S. M. Akbar Berry, Windsor (CA); Spencer Robert Hoernke, Dundas (CA); Paul Iacoban, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/274,864

(22) Filed: Feb. 13, 2019

(65) Prior Publication Data

US 2020/0254909 A1 Aug. 13, 2020

(51) Int. Cl.
*B60N 2/60* (2006.01)
*B60N 2/54* (2006.01)
*B60N 2/68* (2006.01)
*B60N 2/50* (2006.01)
*B60N 2/66* (2006.01)
*B60N 2/62* (2006.01)
*A47C 7/46* (2006.01)

(52) U.S. Cl.
CPC .............. *B60N 2/546* (2013.01); *B60N 2/501* (2013.01); *B60N 2/504* (2013.01); *B60N 2/62* (2013.01); *B60N 2/6673* (2015.04); *B60N 2/68* (2013.01); *A47C 7/46* (2013.01); *A47C 7/462* (2013.01); *A47C 7/465* (2013.01)

(58) Field of Classification Search
CPC ...... B60N 2/546; B60N 2/6673; B60N 2/501; B60N 2/504; B60N 2/66; B60N 2/667; B60N 2/6671; A47C 7/46; A47C 7/462; A47C 7/465
USPC ................................. 297/284.4, 284.7, 284.8
See application file for complete search history.

(56) References Cited

U.S. PATENT DOCUMENTS

| 3,709,559 | A | | 1/1973 | Rowland | |
|---|---|---|---|---|---|
| 4,564,235 | A | * | 1/1986 | Hatsutta | .................. B60N 2/66 297/284.4 |

(Continued)

*Primary Examiner* — Syed A Islam
(74) *Attorney, Agent, or Firm* — David Coppiellie; Price Heneveld LLP

(57) ABSTRACT

A vehicle seating assembly includes a frame and an articulating flexmat assembly operably coupled with the frame. The articulating flexmat assembly includes an upper flexmat extending from a first side of the frame to a second side of the frame and a lower flexmat extending from the first side of the frame to the second side of the frame. The upper flexmat includes an upper static portion and an upper dynamic portion disposed above the upper static portion and adjustable by upper linear actuators that draw the upper dynamic portion toward the upper static portion to arc the upper flexmat outward. The lower flexmat includes a lower static portion adjacent to the upper static portion and a lower dynamic portion disposed below the lower static portion and adjustable by lower linear actuators that draw the lower dynamic portion toward the lower static portion to arc the lower flexmat outward.

20 Claims, 13 Drawing Sheets

(56) References Cited

U.S. PATENT DOCUMENTS

| | | | |
|---|---|---|---|
| 5,050,930 A * | 9/1991 | Schuster | A43D 3/1433 |
| | | | 297/284.4 |
| 5,174,526 A | 12/1992 | Kanigowski | |
| 5,507,559 A * | 4/1996 | Lance | B60N 2/6673 |
| | | | 297/284.5 |
| 5,826,937 A | 10/1998 | Massara | |
| 5,884,968 A | 3/1999 | Massara | |
| 6,338,530 B1 * | 1/2002 | Gowing | A47C 7/465 |
| | | | 297/284.1 |
| 6,530,622 B1 * | 3/2003 | Ekern | B60N 2/2222 |
| | | | 297/284.1 |
| 6,565,153 B2 | 5/2003 | Hensel et al. | |
| 6,619,739 B2 * | 9/2003 | McMillen | A47C 7/462 |
| | | | 297/284.7 |
| 6,644,740 B2 * | 11/2003 | Holst | B60N 2/0232 |
| | | | 297/284.4 |
| 6,779,844 B2 * | 8/2004 | Dosen | B60N 2/6673 |
| | | | 297/284.4 |
| 7,083,232 B2 * | 8/2006 | Frank | A61H 15/0078 |
| | | | 297/284.4 |
| 7,862,119 B2 * | 1/2011 | Schafer | B60N 2/6673 |
| | | | 297/284.8 |
| 7,918,506 B2 * | 4/2011 | Hsiao | A47C 7/462 |
| | | | 297/284.11 |
| 8,201,886 B2 * | 6/2012 | Maierhofer | A47C 7/465 |
| | | | 297/284.1 |
| 9,193,288 B2 * | 11/2015 | Suzuki | B60N 2/6673 |
| 9,254,768 B2 * | 2/2016 | Hong | B60N 2/6671 |
| 9,326,614 B2 * | 5/2016 | Suzuki | B60N 2/667 |
| 9,604,559 B2 * | 3/2017 | Yoo | B60N 2/666 |
| 9,796,309 B2 * | 10/2017 | Song | B60N 2/666 |
| 9,808,093 B2 * | 11/2017 | Rawls-Meehan | A47C 20/041 |
| 10,104,977 B2 * | 10/2018 | Li | A47C 1/0242 |
| 10,278,509 B2 * | 5/2019 | Fujita | A47C 31/006 |
| 10,306,986 B1 * | 6/2019 | Gu | A47C 7/38 |
| 2005/0275263 A1 * | 12/2005 | Norman | A47C 7/46 |
| | | | 297/284.4 |
| 2007/0106188 A1 * | 5/2007 | Walker | A61F 5/028 |
| | | | 602/19 |
| 2007/0236071 A1 | 10/2007 | Fujita et al. | |
| 2012/0007399 A1 * | 1/2012 | Jaranson | B60N 2/66 |
| | | | 297/284.4 |
| 2013/0285426 A1 | 10/2013 | Arant et al. | |
| 2014/0246892 A1 * | 9/2014 | Samain | B60N 2/6673 |
| | | | 297/463.1 |
| 2015/0305506 A1 * | 10/2015 | Suzuki | B60N 2/6673 |
| | | | 297/284.4 |
| 2016/0288681 A1 | 10/2016 | Ferretti et al. | |
| 2017/0360201 A1 * | 12/2017 | Brown | A47C 1/0242 |
| 2019/0191883 A1 | 6/2019 | Zhang | A47C 7/462 |

* cited by examiner

ARTICULATING FLEXMAT SEAT SUSPENSION

FIELD OF THE DISCLOSURE

The present disclosure generally relates to a seat suspension, and more specifically, to an adjustable articulating flexmat seat suspension.

BACKGROUND OF THE DISCLOSURE

As the need for improved vehicle efficiency continues to increase, so too does the interest in versatile seat comfort components that are light and which have a lean profile.

SUMMARY OF THE DISCLOSURE

According to one aspect of the present disclosure, a vehicle seating assembly includes a frame and an articulating flexmat assembly operably coupled with the frame. The articulating flexmat assembly includes an upper flexmat extending from a first side of the frame to a second side of the frame. The upper flexmat includes an upper static portion. The upper flexmat also includes an upper dynamic portion disposed above the upper static portion and adjustable by upper linear actuators that draw the upper dynamic portion toward the upper static portion to arc the upper flexmat outward. The articulating flexmat assembly also includes a lower flexmat extending from the first side of the frame to the second side of the frame. The lower flexmat includes a lower static portion adjacent to the upper static portion. The lower flexmat also includes a lower dynamic portion disposed below the lower static portion and adjustable by lower linear actuators that draw the lower dynamic portion toward the lower static portion to arc the lower flexing outward.

Embodiments of the first aspect of the disclosure can include any one or a combination of the following features:
- wherein the upper linear actuators include first and second upper linear actuators disposed at first and second upper corners of the upper flexmat;
- wherein the lower linear actuators include first and second lower linear actuators disposed at first and second lower corners of the lower flexmat;
- wherein the upper static portion includes rearwardly extending tabs configured to engage the upper linear actuators;
- wherein the lower static portion includes rearwardly extending tabs configured to engage the lower linear actuators;
- wherein at least one of the upper flexmat and the lower flexmat includes multiple undulating flex segments configured to aid in flexure of the at least one of the upper flexmat and the lower flexmat;
- wherein the upper static portion and the lower static portion are a single integral cross-seatback member that is fixedly attached to the frame;
- wherein the upper flexmat and the lower flexmat are constructed of a polymeric composite material;
- wherein each of the upper linear actuators and each of the lower linear actuators are operably coupled with a motor disposed behind the single integral cross-seatback member;
- wherein an upper motor is operably coupled with the upper linear actuators and a lower motor is operably coupled with the lower linear actuators such that the upper flexmat and the lower flexmat can be flexed independently of one another;
- wherein a motor is disposed behind the single integral cross-seatback member; and
- wherein each of the upper flexmat and the lower flexmat include first and second opposing sidewalls that engage an outer surface of the frame.

According to another aspect of the present disclosure, a seating assembly includes a frame and an articulating flexmat assembly operably coupled with the frame. The articulating flexmat assembly includes an upper flexmat extending across the frame. The upper flexmat includes an upper static portion. The upper flexmat also includes an upper dynamic portion that is adjustable to arc the upper flexmat outward. The articulating flexmat assembly also includes a lower flexmat extending across the frame. The lower flexmat includes a lower static portion and a lower dynamic portion that is adjustable to arc the lower flexmat outward.

Embodiments of the second aspect of the disclosure can include any one or a combination of the following features:
- wherein at least one of the upper flexmat and the lower flexmat includes multiple undulating flex segments configured to aid in flexure of the at least one of the upper flexmat and the lower flexmat;
- wherein the upper static portion and the lower static portion are a single integral cross-seatback member that is fixedly attached to the frame; and
- wherein the upper flexmat and the lower flexmat are constructed of a polymeric composite material.

According to yet another aspect of the present disclosure, an articulating flexmat assembly for a seatback includes an upper flexmat and a lower flexmat. The upper flexmat includes an upper static portion. The upper flexmat also includes an upper dynamic portion disposed above the upper static portion and adjustable to arc the upper flexmat outward. The lower flexmat includes a lower static portion extending from the upper static portion. The lower flexmat also includes a lower dynamic portion disposed below the lower static portion and adjustable to arc the lower flexmat outward.

Embodiments of the third aspect of the disclosure can include any one or a combination of the following features:
- upper linear actuators and lower linear actuators that are operably coupled with a motor disposed behind said seatback;
- wherein an upper motor is operably coupled with each of the upper linear actuators and a lower motor is operably coupled with each of the lower linear actuators such that the upper flexmat and the lower flexmat can be flexed independently of one another; and
- wherein each of the upper flexmat and the lower flexmat include first and second opposing sidewalk that engage an outer surface of a frame.

These and other aspects, objects, and features of the present disclosure will be understood and appreciated by those skilled in the art upon studying the following specification, claims, and appended drawings.

DETAILED DESCRIPTION

Figure 1:
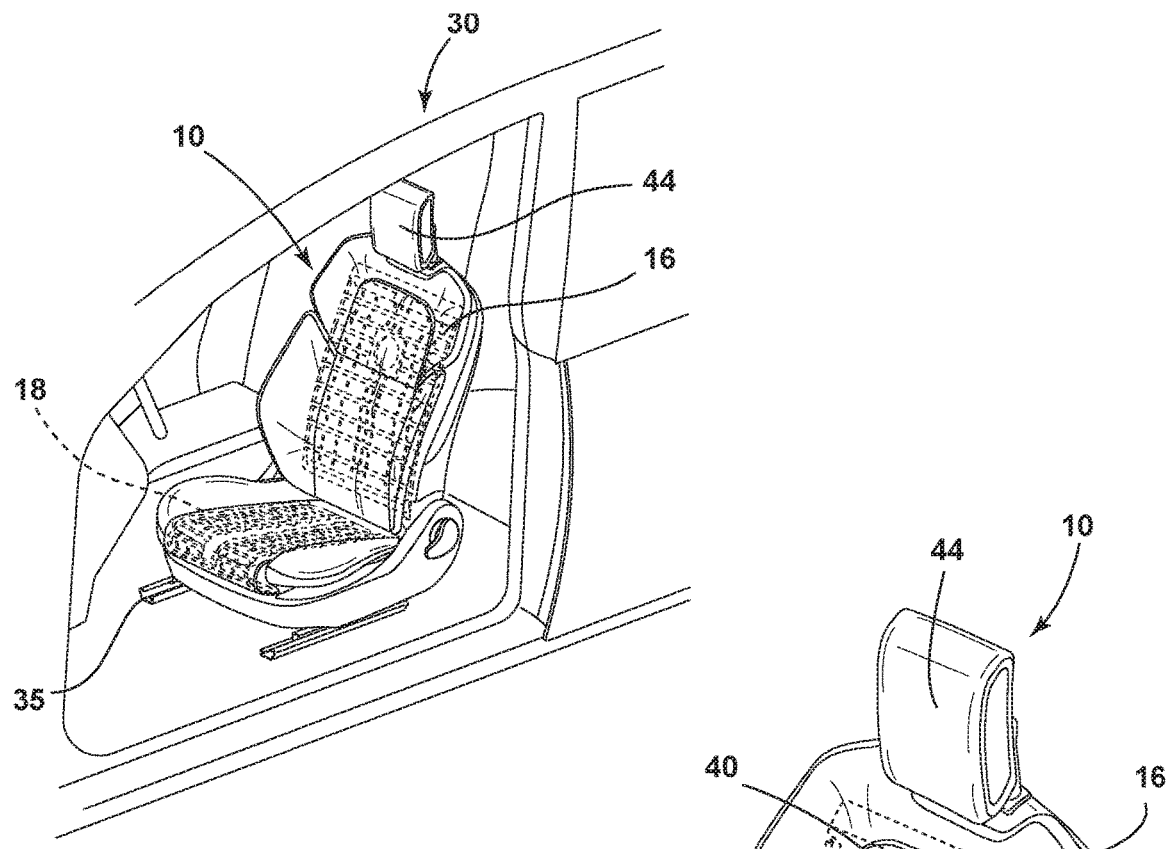
FIG. 1 is a top perspective view of a seating assembly, of the present disclosure, positioned inside a vehicle.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-15, reference number 10 generally designates a vehicle seating assembly including a seat carrier 12 that defines a central opening 14. A seatback 16 is pivotally coupled to the seat carrier 12. A seat flexmat 18 is disposed in the central opening 14 and operable between flexed and unflexed conditions. The vehicle seating assembly 10 also includes a first thigh extension 20 that is extendable and rotatable relative to the seat carrier 12 and a second thigh extension 22 that is extendable and rotatable relative to the seat carrier 12. The first thigh extension 20 includes a first thigh flexmat 24 operable between flexed and unflexed conditions. The second thigh extension 22 includes a second thigh flexmat 26 operable between flexed and unflexed conditions.

Figure 2:
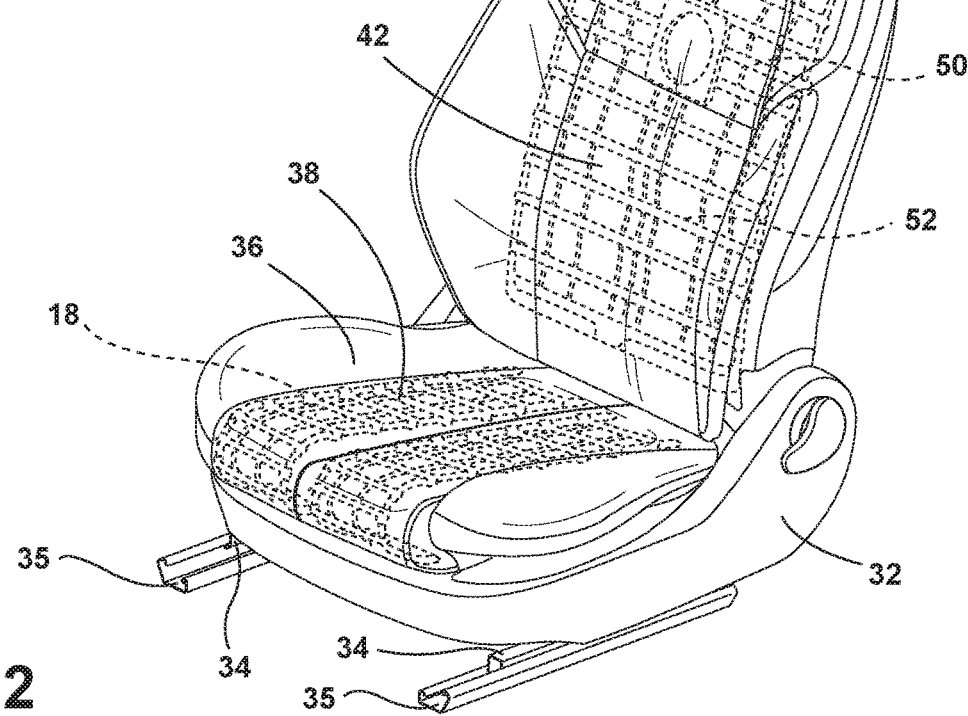
FIG. 2 is a top perspective view of the vehicle seating assembly of FIG. 1.

With reference to FIGS. 1 and 2, the vehicle seating assembly 10 may be used in any vehicle 30, such as a car, a truck, a van, etc. It is also contemplated that the concept set forth in this disclosure may be utilized in a front or forward position of the vehicle 30 as well as a rear or rearward position of the vehicle 30. The vehicle seating assembly 10, as illustrated, includes a frame 31 (FIG. 9) and a seat base 32 that is positioned on rail slides 34 that slide on rails 35 to allow fore and aft movement of the vehicle seating assembly 10 relative to the vehicle 30. A seat 36 is positioned on the seat carrier 12 and is operably coupled with the seat base 32 and movable relative thereto, as set forth in further detail herein. The seat 36 includes a cushion assembly 38 supported thereon, and which defines a seating surface. In addition, the seatback 16 of the vehicle seating assembly 10 includes an upper thoracic region 40 and a lower lumbar region 42 as well as a head restraint 44. Each of the components of the seatback 16 may be configured for adjustability to properly support the weight of various occupants of various sizes inside the vehicle 30.

The seating assembly 10 as set forth herein utilizes the seat flexmat 18 which also acts as a suspension within the seating assembly 10. Accordingly, traditional foam and wire suspension components can be removed, thereby reducing weight and assembly processes during construction of the seating assembly 10. In addition, the seating assembly 10, as set forth herein, provides improved comfort.

With reference again to FIGS. 1 and 2, the seatback 16 includes an upper flexmat 50 and a lower flexmat 52. The upper flexmat 50 is disposed proximate the upper thoracic region 40, while the lower flexmat 52 is disposed proximate the lower lumbar region 42. Notably, as shown in FIG. 2, the seat 36 also includes the seat flexmat 18 which is operably coupled with the seat carrier 12 and which is operable between the flexed and unflexed conditions.

Figure 3:
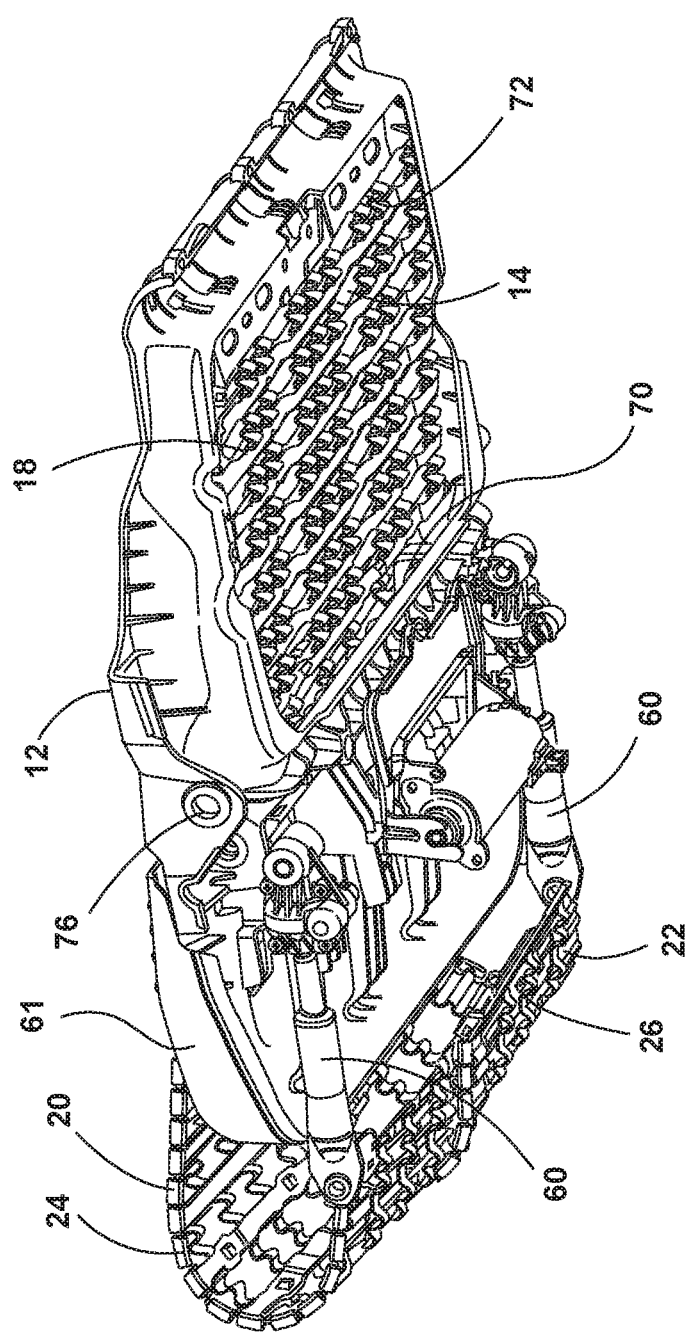
FIG. 3 is a bottom perspective view of a portion of a seat with a cushion assembly removed therefrom.

With reference now to FIG. 3, the motion of the first thigh flexmat 24 and the second thigh flexmat 26 is driven by synchronized linear actuators 60 that are disposed on each side of the seat 36. The synchronized linear actuators 60 may be disposed below a forward seat pan 61 extending from the seat carrier 12. One linear actuator 60 is configured to adjust each of the first and second thigh extensions 20, 22, and more specifically, adjust the first and second thigh flexmats 24, 26 positioned on the first and second thigh extensions 20, 22 between flexed and unflexed conditions. One electric motor is disposed between the linear actuators 60 and is configured to adjust extension of the first and second thigh extensions 20, 22, and possibly the seat flexmat 18. Another motor may be present on the seat frame 31 structure, which is configured to adjust thigh tilt of the first and second thigh extensions 20, 22. The seat carrier 12 also includes the seat flexmat 18 disposed in the central opening 14 of the seat carrier 12. The seat flexmat 18 may be operable between flexed and unflexed conditions to provide additional support to an underside of the thighs of an occupant. It is generally contemplated that the seat flexmat 18 may be adjustable such that a front portion 70 of the seat flexmat 18 is drawn rearward toward a rear portion 72 of the seat flexmat 18, or that the rear portion 72 of the seat flexmat 18 is drawn forward toward the front portion 70 of the seat flexmat 18.

In either instance, the seat flexmat 18 is configured to flex upward toward the cushion assembly 38 that defines the seating surface for supporting the occupant.

Figure 5:
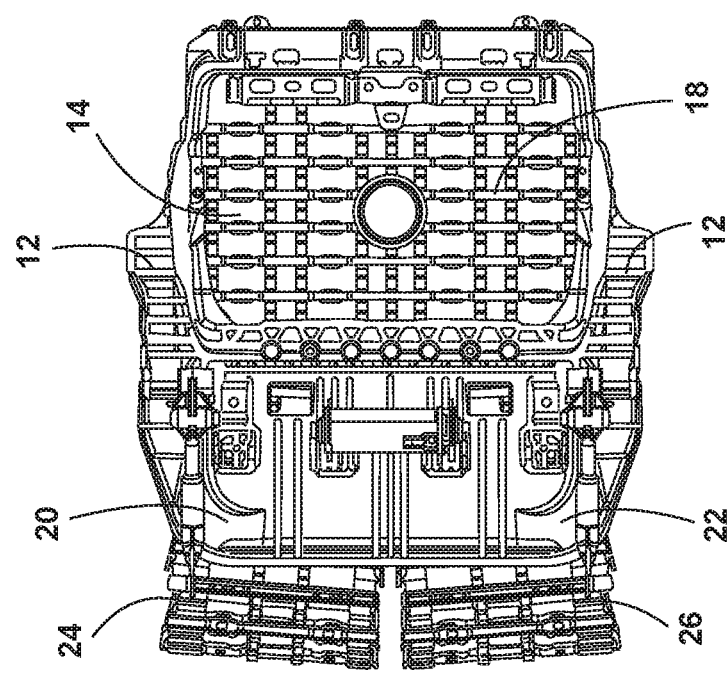
FIG. 5 is a bottom plan view of the seat of FIG. 3.
Figure 4:
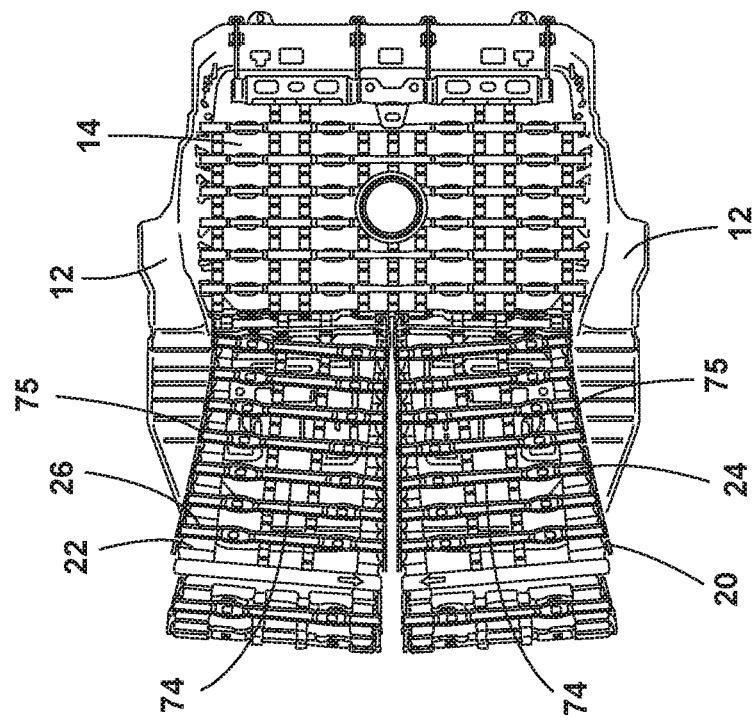
FIG. 4 is a top plan view of the seat of FIG. 3.

With reference now to FIGS. 4 and 5, the seat carrier 12 defines the structure that supports the seat flexmat 18 as well as the first thigh extension 20 and the second thigh extension 22. The first thigh flexmat 24 and the second thigh flexmat 26 extend over the first thigh extension 20 and the second thigh extension 22, respectively. It will be understood that the first thigh extension 20 may be integral with the first thigh flexmat 24, or that any underlying support may define the first thigh extension 20, wherein the first thigh flexmat 24 rests on the first thigh extension 20. Similarly, the second thigh extension 22 may be integral with the second thigh flexmat 26, or an underlying support may define the second thigh extension 22, wherein the second thigh flexmat 26 rests on the second thigh extension 22. The cushion assembly 38 (removed in FIG. 4) is disposed over the seat flexmat 18 as well as the first thigh flexmat 24 and the second thigh flexmat 26 such that the construction of the flexmats 18, 24, 26 is not felt by the seated occupant. Upon activation of a switch, that is operably coupled with the motor, the linear actuators 60 are engaged resulting in movement of the first thigh flexmat 24 alone, the second thigh flexmat 26 alone, or the first and second thigh flexmats 24, 26 in unison. Another selection of the switch results in movement of the first and second thigh flexmats 24, 26 to the unflexed condition. The first thigh flexmat 24 and the second thigh flexmat 26 may include increased flexure proximate an interior region 74 of the first thigh flexmat 24 and the second thigh flexmat 26, as compared to the flexure proximate a peripheral region 75 of the first thigh flexmat 24 and the second thigh flexmat 26.

Figure 6:
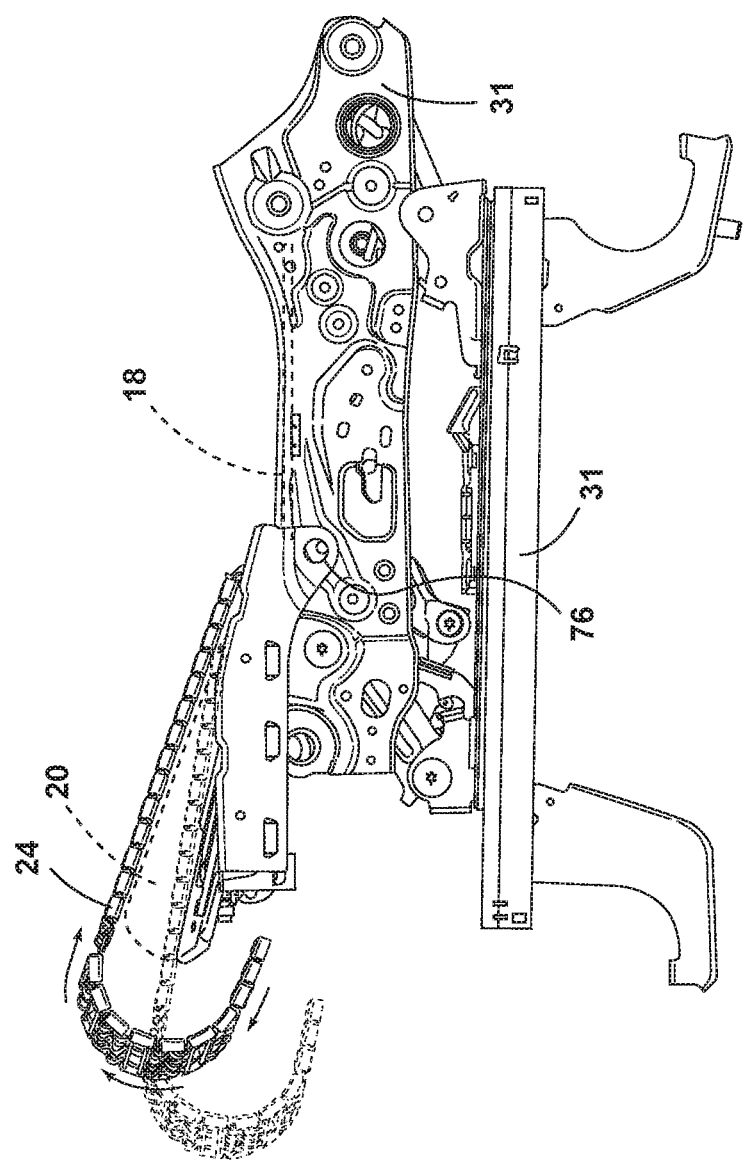
FIG. 6 is a side elevational view illustrating a seat base and articulating flexmats.
Figure 6A:
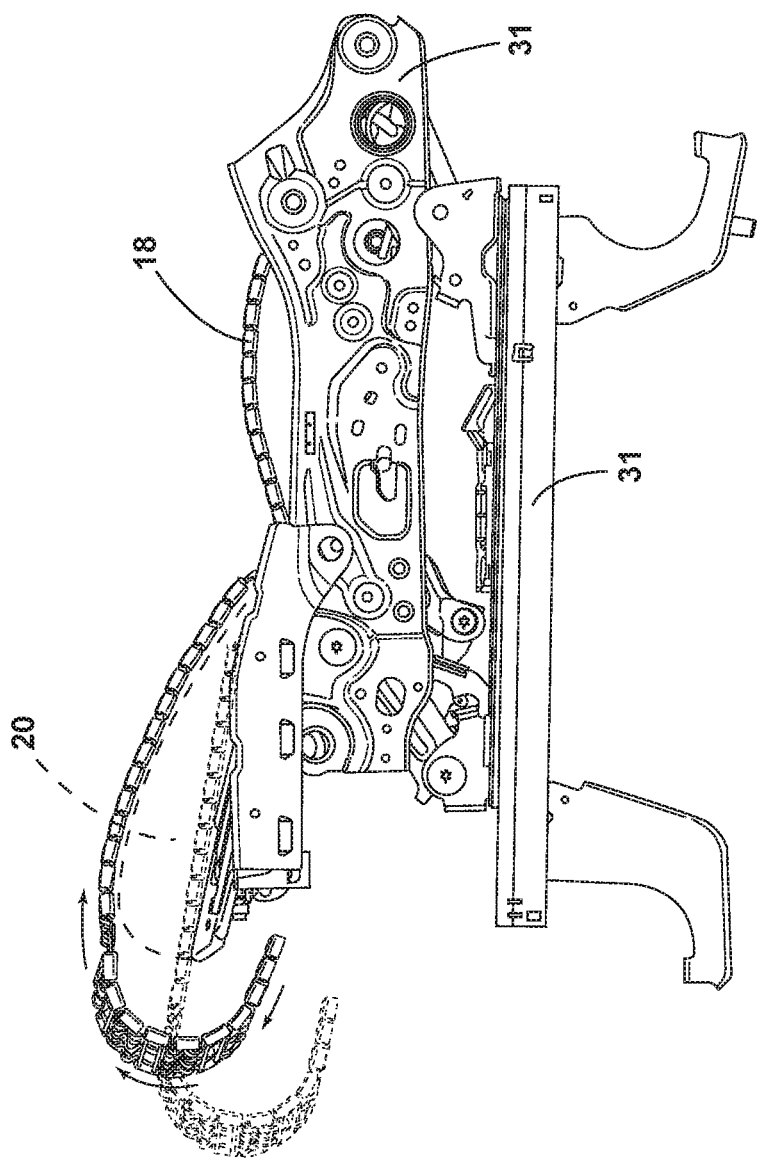
FIG. 6A is a side elevational view illustrating a seat base and articulating flexmats.

With reference now to FIGS. 6 and 6A, the various conditions of the seating assembly 10 are illustrated. As shown in FIG. 6, the first and second thigh extensions 20, 22 are pivotably adjustable about a pivot rod 76 disposed on the seat carrier 12. Movement of the first thigh extension 20 and the second thigh extension 22 between raised and lowered positions does not affect, or only minimally affects, adjustment of the first thigh flexmat 24 and the second thigh flexmat 26. In addition, the seat flexmat 18 is also adjustable between flexed and unflexed conditions. FIG. 6 illustrates the first and second thigh extensions 20, 22 in the unflexed condition and the seat flexmat 18 in the unflexed condition. FIG. 6A illustrates the first thigh flexmat 24 and the second thigh flexmat 26 in the flexed condition and the seat flexmat 18 in the flexed condition. It will be understood that the first thigh flexmat 24, the second thigh flexmat 26, and the seat flexmat 18 are all independently adjustable or may adjust in unison.

Figure 7:
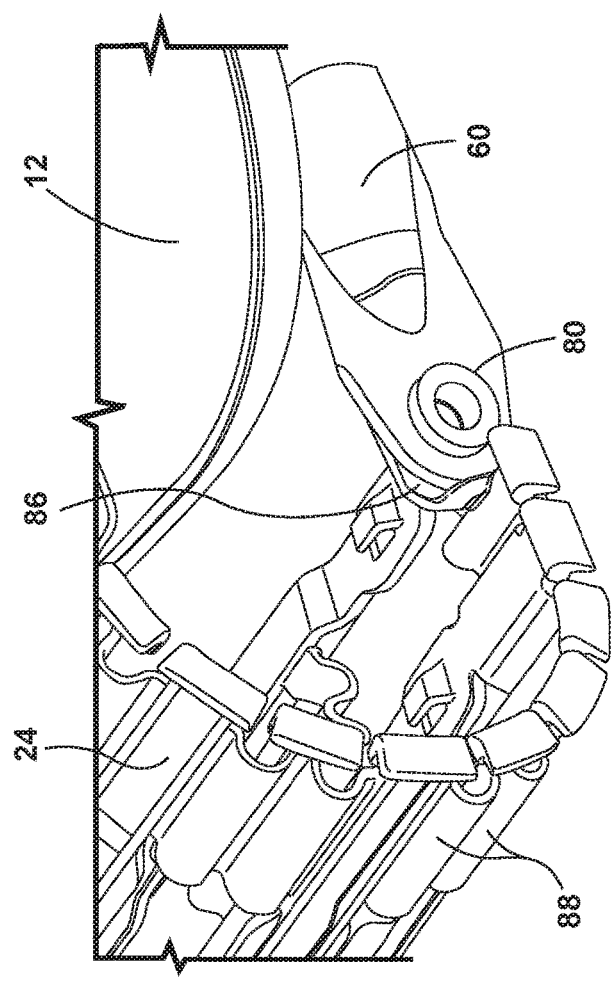
FIG. 7 is a partial top perspective view of a portion of a thigh extension of the present disclosure.
Figure 8:
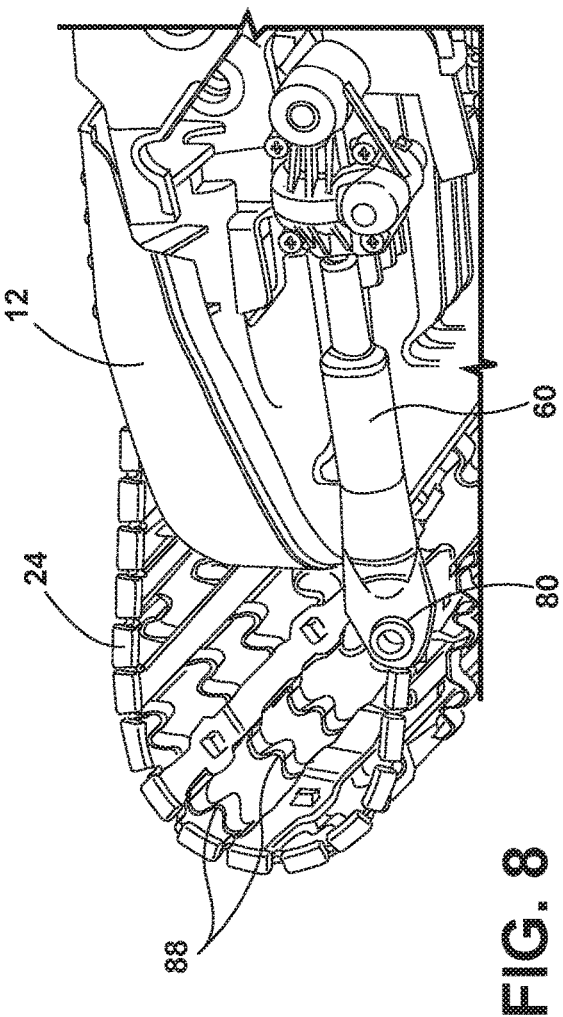
FIG. 8 is a bottom perspective view of a portion of a thigh extension of the present disclosure.

With reference to FIGS. 7 and 8, the linear actuators 60 are shown. The linear actuators 60 include a pivot pin assembly 80 that is operably coupled with each of the first and second thigh flexmats 24, 26. The linear actuators 60 are adjustable to a fully extended position and a fully unextended position. When the linear actuators 60 are in the fully extended position, the first and second thigh flexmats 24, 26 are in the fully flexed condition (FIG. 6A). When the linear actuators 60 are withdrawn to the fully unextended position, the first and second thigh flexmats 24, 26 are in the unflexed condition (FIG. 6). It will be understood that the pivot pin assembly 80 may include molded-in attachment features 86 configured to attach with the linear actuators 60 during assembly. The linear actuators 60 are also pivotally coupled with the seat carrier 12.

Figure 12:
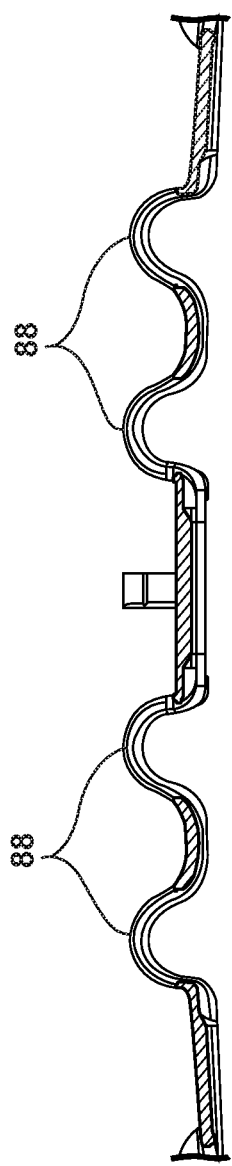
FIG. 12 is a side cross-sectional view of a portion of a flexmat of the present disclosure.

As shown in FIG. 12, the details of each of the first and second thigh flexmats 24, 26 include semi-circular, or undulating, members 88 that enables up, down, and cross-car flexure. This construction provides for increased comfort. In addition, it will be understood that the first and second thigh flexmats 24, 26 may be configured to protrude outwardly in a flexed state toward the occupant with linear actuation or may be configured to cave inward with linear actuation away from the occupant. The first and second thigh flexmats 24, 26 are generally constructed of a plastic composite material that does not take a set when in the same position for a long period of time. Accordingly, the first and second thigh flexmats 24, 26 may be used repeatedly with little or no wear.

Figure 9:
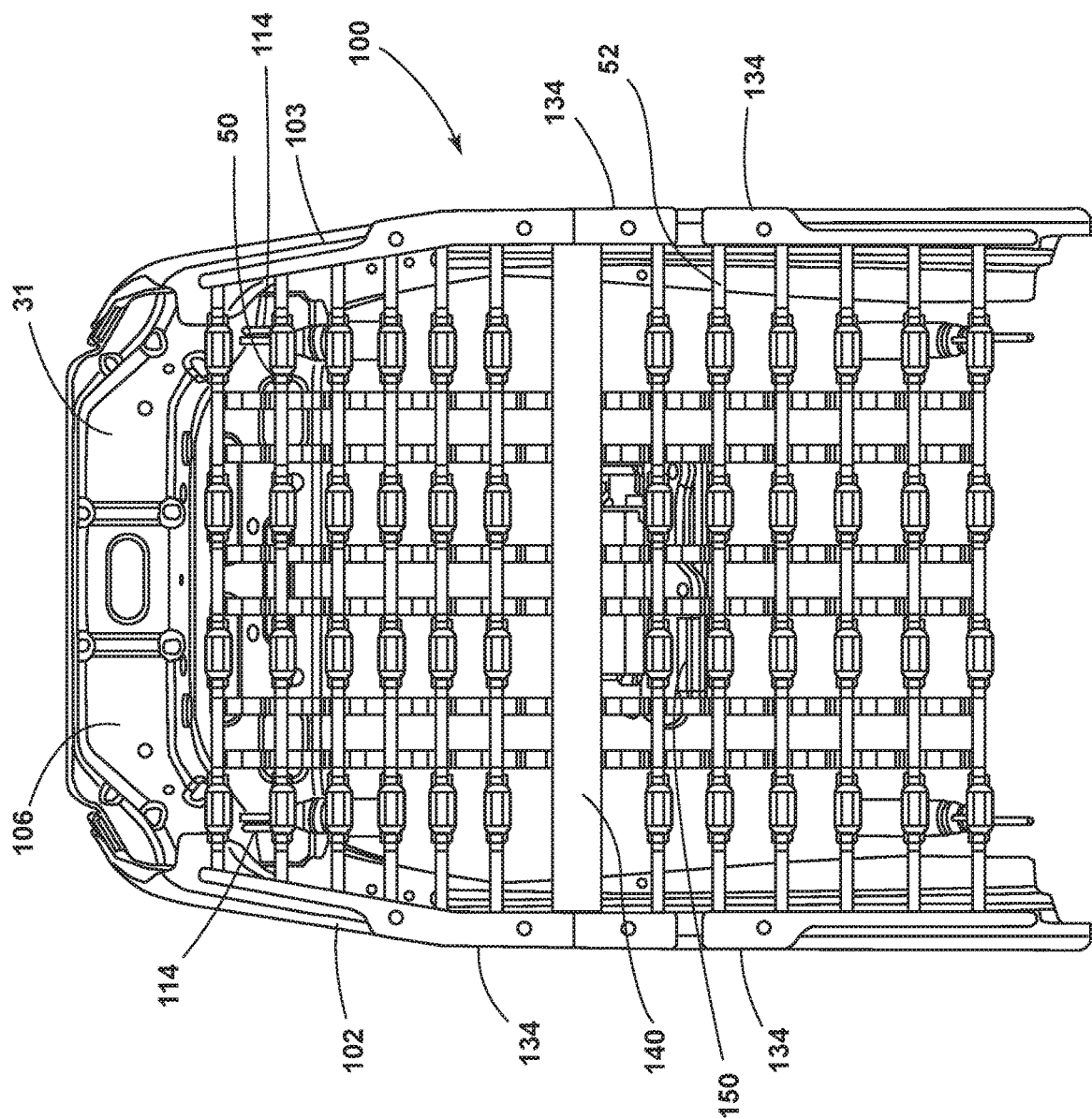
FIG. 9 is a front elevational view of a seatback of the present disclosure with a cushion assembly removed therefrom.
Figure 10:
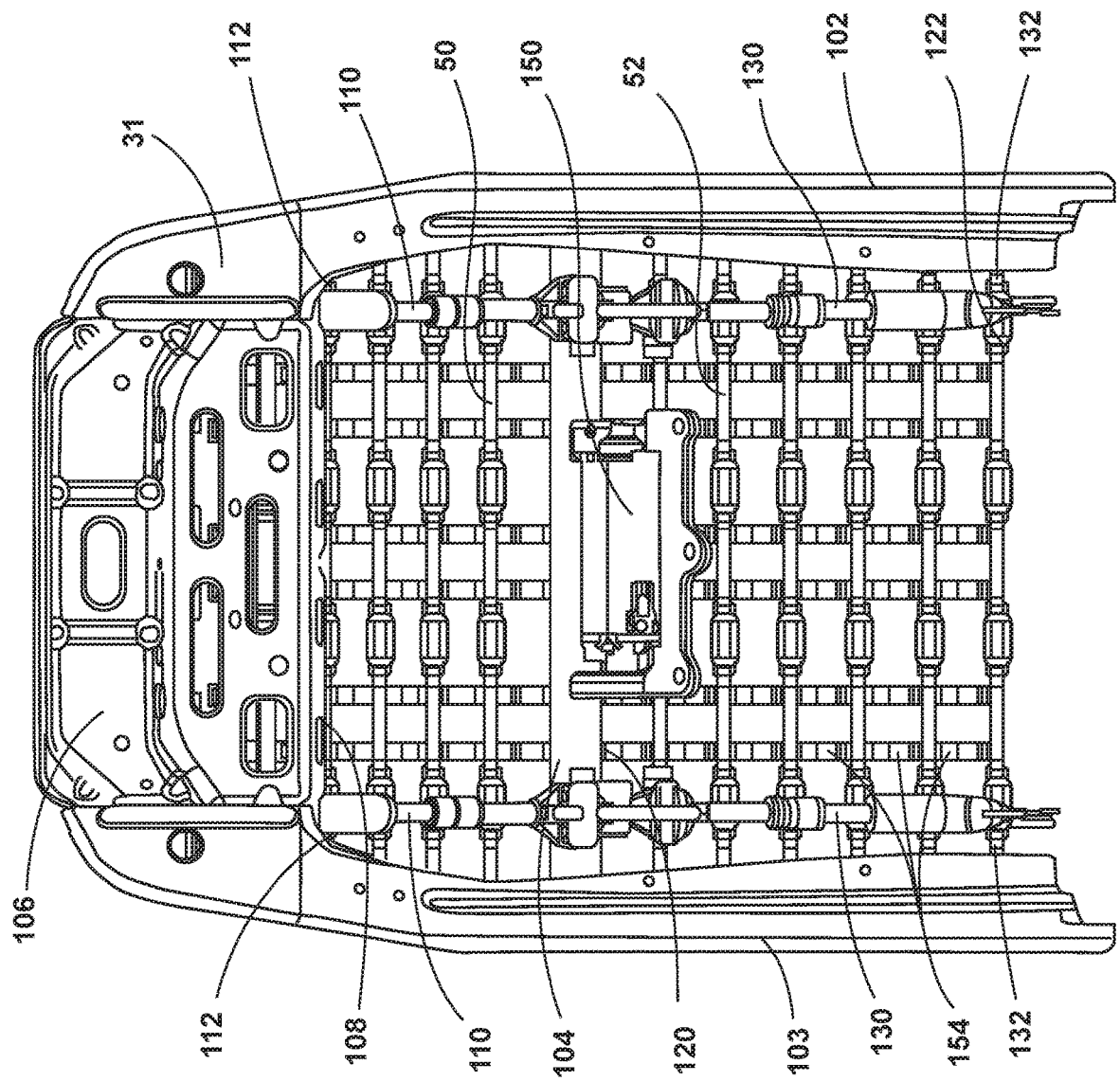
FIG. 10 is a rear elevational view of the seatback of FIG. 9.

With reference now to FIGS. 9 and 10, the seating assembly 10 also includes an articulating flexmat assembly 100 operably coupled with the seatback 16. The articulating flexmat assembly 100 includes the upper flexmat 50 that extends from a first side 102 of the frame 31 to a second side 103 of the frame 31. The upper flexmat 50 includes an upper static portion 104 that is pivotally coupled with an upper cross member 106 of the frame 31. The upper flexmat 50 also includes an upper dynamic portion 108 that is disposed above the upper static portion 104. The upper dynamic portion 108 is adjustable by upper linear actuators 110 that draw the upper dynamic portion 108 toward the upper static portion 104 to flex the upper flexmat 50 outward. As shown in FIG. 10, first and second upper linear actuators 110 are disposed at first and second upper corners 112 of the upper flexmat 50. In addition, the upper static portion 104 may include rearwardly extending tabs 114 configured to engage the upper linear actuators 110. In addition, the articulating flexmat assembly 100 also includes the lower flexmat 52. The lower flexmat 52 extends from the first side 102 of the frame 31 to the second side 103 of the frame 31 and includes a lower static portion 120 that is adjacent to the upper static portion 104 and a lower dynamic portion 122 that is disposed below the lower static portion 120. The lower dynamic portion 122 is adjustable by lower linear actuators 130 that draw the lower dynamic portion 122 toward the lower static portion 120 to flex the lower flexmat 52 outward. There may be first and second lower linear actuators 130 disposed at first and second lower corners 132 of the lower flexmat 52. Each of the upper flexmat 50 and the lower flexmat 52 include side flanges 134 configured to rest against a front side of the frame 31. Also, as illustrated, the lower static portion 120 and the upper static portion 104 are generally adjacent one another and also adjacent to a central crossbar 140. The upper static portion 104 and the lower static portion 120 may be a single integral cross-seatback member that is fixedly attached to the frame 31 at the central crossbar 140. As shown in FIG. 10, a motorized assembly 150 is disposed behind the central crossbar 140 and is configured to power the upper linear actuators 110 and the lower linear actuators 130. The upper linear actuators 110 operate in unison to draw the upper dynamic portion 108 downward toward the upper static portion 104. The lower linear actuators 130 operate in unison to draw the lower dynamic portion 122 upward toward the lower static portion 120. Both the upper flexmat 50 and the lower flexmat 52 may include multiple undulating flex segments 154 configured to aid in flexure of at least one of the upper flexmat 50 and the lower flexmat 52.

Figure 11:
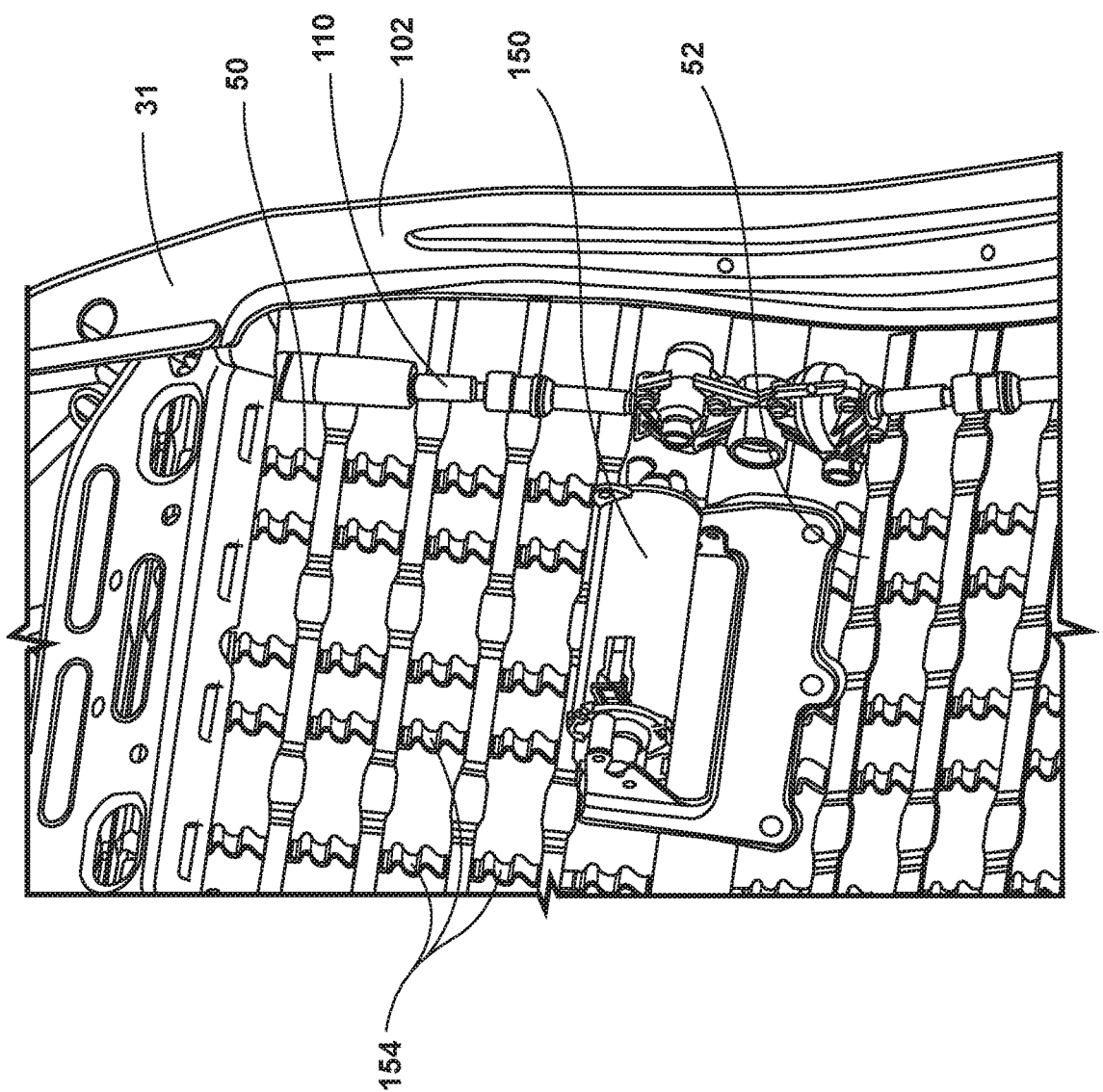
FIG. 11 is a partial bottom perspective view of a motor and linkage configured to move a seatback flexmat between flexed and unflexed conditions.

As shown in FIG. 11, in a similar manner to that set forth with regard to the first and second thigh flexmats 24, 26 discussed earlier, the upper linear actuators 110 are pivotally coupled with both the upper static portion 104 and the upper dynamic portion 108 of the upper flexmat 50. Similarly, the lower linear actuators 130 are pivotally coupled with both the lower static portion 120 and the lower dynamic portion 122 of the lower flexmat 52. The undulating construction of the upper flexmat 50 and the lower flexmat 52 (shown in FIG. 12) provides for exceptional up, down, and cross-car flexure.

Figure 13:
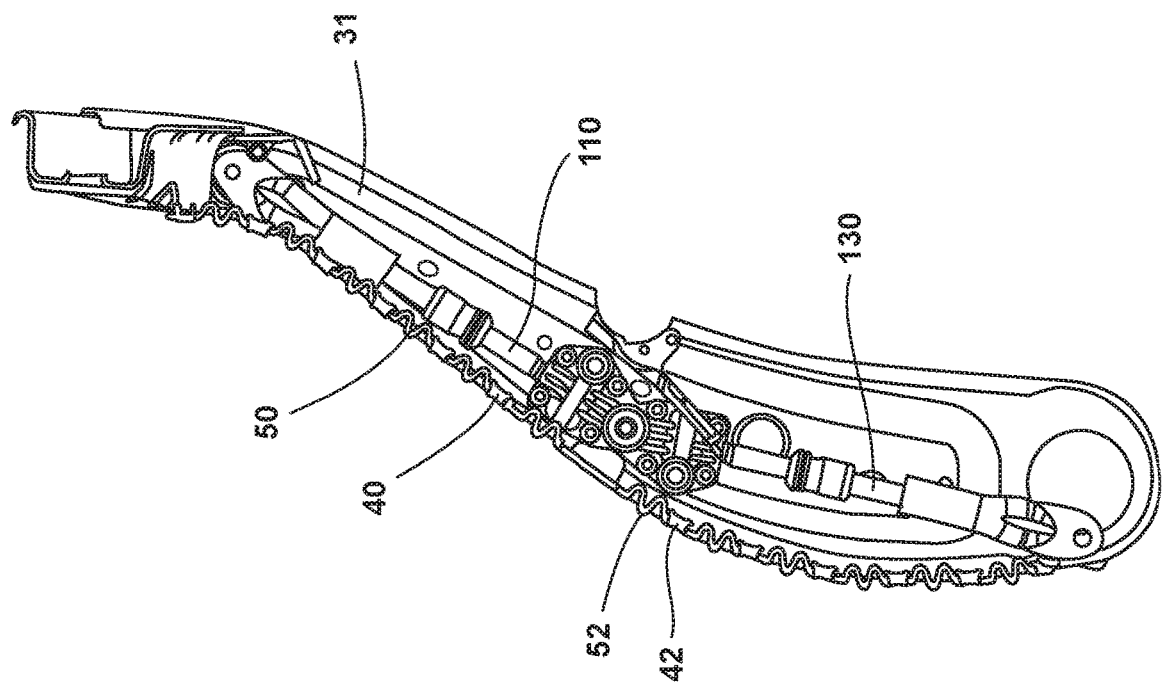
FIG. 13 is a side elevational cross-sectional view of a seatback of the present disclosure.
Figure 13A:
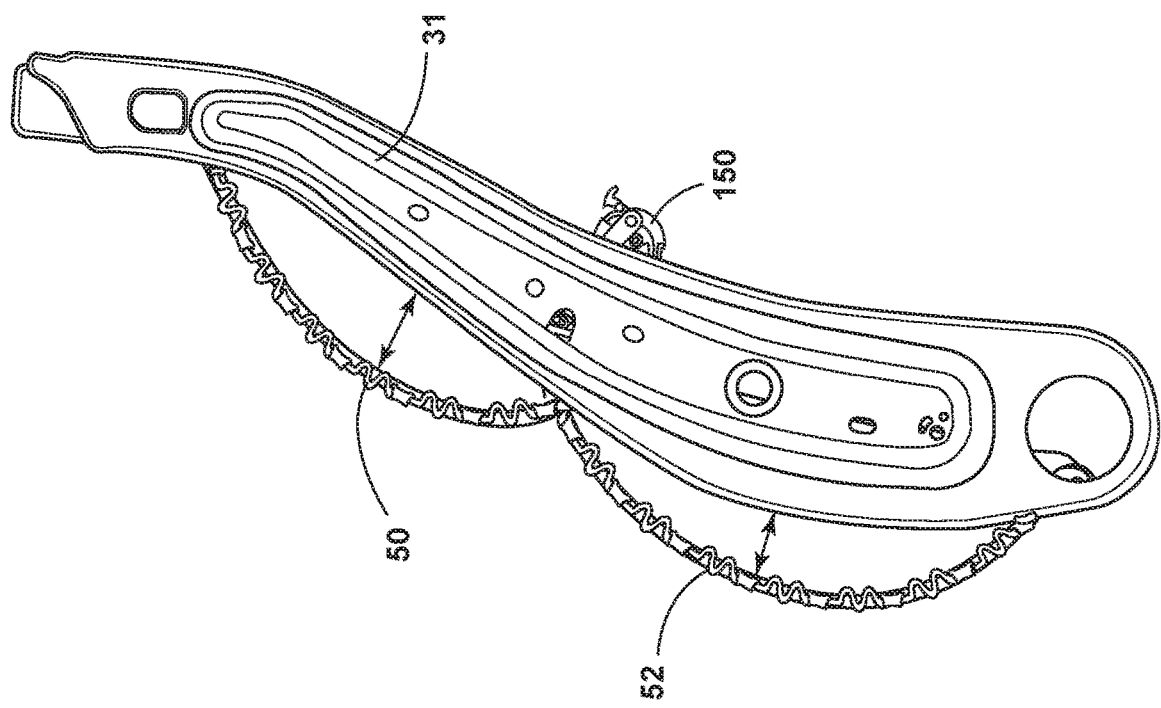
FIG. 13A is a side elevational view of a seatback with seatback side flexmats moved to a flexed condition.

With reference now to FIGS. 13 and 13A, adjustment of the upper and lower flexmats 50, 52 is illustrated. When in the unflexed condition, the upper flexmat 50 and the lower flexmat 52 generally extend across a front surface of the first and second sides 102, 103 of the seat frame 31. After installation, the cushion assembly 38 will be disposed over the upper flexmat 50 and the lower flexmat 52. Upon actuation by a user, which may involve activation of a button or slide that is in electrical communication with the motor, the upper flexmat 50 and the lower flexmat 52 flex outward when moving to the flexed condition. It will be understood that the upper flexmat 50 may be independently adjustable relative to the lower flexmat 52, and the lower flexmat 52 may be independently adjustable relative to the upper flexmat 50. It will also be understood that the upper and lower flexmats 50, 52 extend across the entire seatback 16 and provide exceptional breathability through the seatback 16. Accordingly, any climate control structure that is applied to the seatback 16 is not hindered by use of the articulating flexmat assembly 100 for the seatback 16 as set forth herein.

Figure 14:
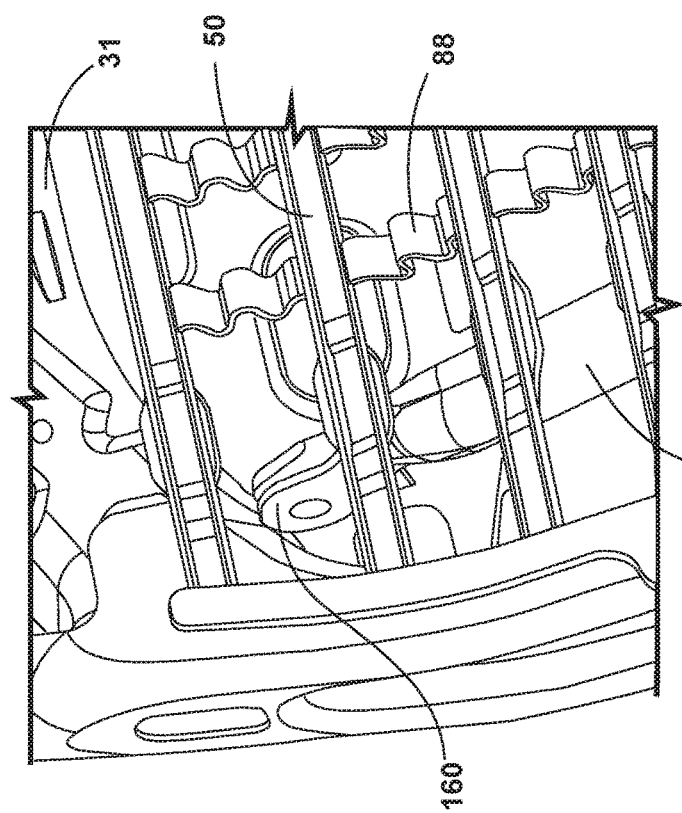
FIG. 14 is a partial bottom perspective view of a top of a seatback flexmat of the present disclosure.
Figure 15:
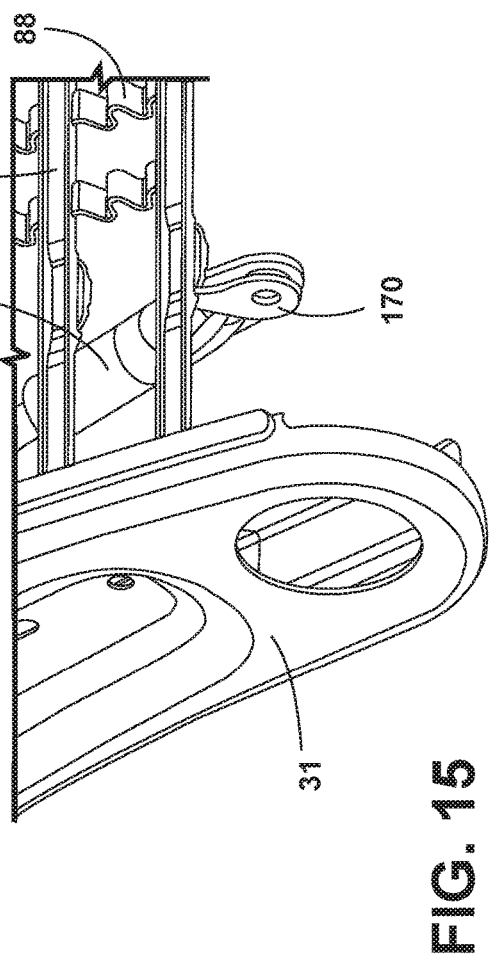
FIG. 15 is a bottom perspective view of a bottom of a flexmat of the present disclosure.

With reference now to FIG. 14, the upper flexmat 50 also includes a pivot pin assembly 160 that pivotally links each of the upper linear actuators 110 to the upper flexmat 50. The pivot pin assembly 160 may be formed as part of the upper flexmat 50. Similarly, as shown in FIG. 15, the lower flexmat 52 includes a pivot pin assembly 170 that pivotally links each of the lower linear actuators 130 to the lower flexmat 52. The pivot pin assembly 170 may be formed as part of the lower flexmat 52.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly comprising:
   a frame;
   an articulating flexmat assembly operably coupled with the frame and comprising:
      an upper flexmat extending from a first side of the frame to a second side of the frame and including:
         an upper static portion; and
         an upper dynamic portion disposed above the upper static portion and adjustable by upper linear actuators that draw the upper dynamic portion toward the upper static portion to arc the upper flexmat outward; and
      a lower flexmat extending from the first side of the frame to the second side of the frame and including:
         a lower static portion adjacent to the upper static portion; and
         a lower dynamic portion disposed below the lower static portion and adjustable by lower linear actuators that draw the lower dynamic portion toward the lower static portion to arc the lower flexmat outward.

2. The vehicle seating assembly of claim 1, wherein the upper linear actuators include first and second upper linear actuators disposed at first and second upper corners of the upper flexmat.

3. The vehicle seating assembly of claim 1, wherein the lower linear actuators include first and second lower linear actuators disposed at first and second lower corners of the lower flexmat.

4. The vehicle seating assembly of claim 1, wherein the upper static portion includes rearwardly extending tabs configured to engage the upper linear actuators.

5. The vehicle seating assembly of claim 1, wherein the lower static portion includes rearwardly extending tabs configured to engage the lower linear actuators.

6. The vehicle seating assembly of claim 1, wherein at least one of the upper flexmat and the lower flexmat includes multiple undulating flex segments configured to aid in flexure of the at least one of the upper flexmat and the lower flexmat.

7. The vehicle seating assembly of claim 1, wherein the upper static portion and the lower static portion are a single integral cross-seatback member that is fixedly attached to the frame.

8. The vehicle seating assembly of claim 1, wherein the upper flexmat and the lower flexmat are constructed of a polymeric composite material.

9. The vehicle seating assembly of claim 7, wherein each of the upper linear actuators and each of the lower linear actuators are operably coupled with a motor disposed behind the single integral cross-seatback member.

10. The vehicle seating assembly of claim 9, wherein an upper motor is operably coupled with the upper linear actuators and a lower motor is operably coupled with the lower linear actuators such that the upper flexmat and the lower flexmat can be flexed independently of one another.

11. The vehicle seating assembly of claim 7, wherein a motor is disposed behind the single integral cross-seatback member.

12. The vehicle seating assembly of claim 1, wherein each of the upper flexmat and the lower flexmat include first and second opposing sidewalls that engage an outer surface of the frame.

13. A seating assembly comprising:
   a frame;
   an articulating flexmat assembly operably coupled with the frame and comprising:
      an upper flexmat extending across the frame and including:
         an upper static portion; and
         an upper dynamic portion that is adjustable to arc the upper flexmat outward; and
      a lower flexmat extending across the frame and including:
         a lower static portion; and
         a lower dynamic portion that is adjustable to arc the lower flexmat outward.

14. The seating assembly of claim 13, wherein at least one of the upper flexmat and the lower flexmat includes multiple undulating flex segments configured to aid in flexure of the at least one of the upper flexmat and the lower flexmat.

15. The seating assembly of claim 13, wherein the upper static portion and the lower static portion are a single integral cross-seatback member that is fixedly attached to the frame.

16. The seating assembly of claim 13, wherein the upper flexmat and the lower flexmat are constructed of a polymeric composite material.

17. An articulating flexmat assembly for a seatback comprising:
   an upper flexmat including:
      an upper static portion; and
      an upper dynamic portion disposed above the upper static portion and adjustable to arc the upper flexmat outward; and
   a lower flexmat including:
      a lower static portion extending from the upper static portion; and
      a lower dynamic portion disposed below the lower static portion and adjustable to arc the lower flexmat outward.

18. The articulating flexmat assembly of claim 17, further comprising:
   upper linear actuators and lower linear actuators that are operably coupled with a motor disposed behind said seatback.

19. The articulating flexmat assembly of claim 18, wherein an upper motor is operably coupled with each of the upper linear actuators and a lower motor is operably coupled with each of the lower linear actuators such that the upper flexmat and the lower flexmat can be flexed independently of one another.

20. The articulating flexmat assembly of claim 17, wherein each of the upper flexmat and the lower flexmat include first and second opposing sidewalls that engage an outer surface of a frame.

* * * * *